Patented Mar. 23, 1943

2,314,565

UNITED STATES PATENT OFFICE 2,314,565

COATED FERROUS ARTICLE AND METHOD OF MAKING THE SAME

John S. Thompson, Detroit, Mich., assignor to Parker Rust Proof Company, Detroit, Mich.

No Drawing. Application May 29, 1940, Serial No. 337,860

27 Claims. (Cl. 148—6.5)

This invention relates to the field of treating ferrous surfaces so as to render them resistant to corrosion. An object of the invention is to provide a coating on ferrous surfaces, the formation of which coating involves chemical reaction with the surface of the metal so that the coating is substantially integral with the metal, in that there is chemical reaction at the surface of the metal which reaction results in a chemically produced bond with the coating. Preferably the coating thus formed is itself resistant to corrosion and also serves as a bonding coat for applied coating compositions such as paints, lacquers, enamels and the like. In some cases the coating is so thin as to be barely visible but yet renders the metallic surface more resistant to corrosion, especially when covered by an applied coating composition.

In its broader aspects this application is a continuation in part of a co-pending application for "Method of processing metal," Serial No. 45,792, filed October 19, 1935, by myself and Herman J. Lodeesen, and of a co-pending application for "Method and composition for treating metal," Serial No. 97,298, filed August 21, 1936, by myself and Edwin W. Goodspeed.

Generally speaking, the invention comprises treating ferrous surfaces so as to produce a chemical reaction with the metal, and thereafter applying to the surface, carrying products of the reaction of the first treatment, a solution comprising hexavalent chromium, and drying the second said solution on the surface at an elevated temperature, which for brevity is called baking. The first step may be carried far enough to produce on the surface a sufficient coating to constitute in itself an important corrosion-resistant and bonding coating. In most cases the second step is employed before the reaction of the first step with the surface of the metal is more than superficial. In some cases the solution employed in the first step is washed off before the second solution is applied, but in some cases this is not necessary. Where the first solution contains ingredients which may interfere with the action of the second solution, and especially if the second solution is applied by immersion or by a washing action that involves recirculating the solution, a rinse is indicated between the first and second treatment, and such an intermediate rinse can be used without detriment except where the first step leaves but a very small amount of the products of its reaction on the surface of the metal, or where a water rinse would remove the products of the first reaction too completely, or where it is helpful to have some of the first solution as well as its products on the surface of the work for reaction with the second solution.

In many cases the first solution will react with the metal surface to give a definite, substantial coating, but under usual conditions it is preferred that the second solution should be applied before the first coating is more than superficial, or before it is over one gram on a square yard of surface.

It is generally advantageous to have in the preliminary bath soluble compounds of metals, the oxides or salts of which may be included with compounds of iron to form a coating. For example, in treating iron, compounds of magnesium, calcium, barium, strontium, aluminum, zinc and manganese above iron, of cadmium sometimes classed above and sometimes classed below iron, and cobalt, nickel, tin, lead, bismuth, antimony, arsenic, molybdenum, mercury, silver, etc., below iron may be used. If there are used soluble compounds of metals below iron in the electromotive series, the coating action is accelerated, and in some instances some of these metals may be deposited in metallic form. Obviously, no compounds should be used which tend to poison the solution. Compatible oxidizing agents expedite the production of most chemical coatings on metal, and may be used where such expediting effect is desired or where an oxide coating is to be produced. Compatible oxidizing agents are those which are soluble in the solution being employed and which do not react with other ingredients of the solution so as to destroy their effect or so as to have their own oxidizing effect destroyed before it is exerted in the reaction which takes place at the surface being treated.

The first step is advantageous for various reasons. Aqueous solutions containing hexavalent chromium, especially in the form of chromic acid, have a tendency to "creep" or draw away from the edges and also to leave bare spots on the surface of the metal, especially as the solutions become concentrated during baking. Also, the combination with the second solution of the products of the first step generally facilitates the hardening of the second solution and the reduction of its solubility by baking.

In general, the first step may include any chemical treatment of the metal which produces on the surface of the metal a product which is more readily soluble in the second solution than is the metal being treated and which acts to prevent creepage of the second solution or retards its creepage until baked enough so that creepage is arrested.

The first treatment, as indicated above, may result in a coating essentially oxide, a coating of a metallic deposit, a coating of a salt of iron and additional salts, if desired, or in mixtures of any two or all three of the types mentioned, and may include sulphides or other ingredients which perform like functions.

For example, the first step may be treatment with any one of the many known phosphate coating solutions, or with solutions of organic coating acids, such as described in Patent No. 1,911,537, to Robert R. Tanner, for example. But, if a solution of this type is employed, whether with or without oxidizing agents, accelerating metal compounds, or other obvious modifications, the treatment should be limited so as to produce a much thinner coat than has been hitherto generally desired as a product of such solutions, so that the major part of the final coating is produced by the second treatment, and preferably so that the second solution may treat the metal surface as well as the product of the first treatment.

The following examples will serve to illustrate means by which oxide coats may be produced upon metal.

Upon steel, first coatings have been produced by treating the surface of the metal with a solution for two minutes where the solution contained as its active chemical 2.5% of the nitrates of manganese, chromium, magnesium, cobalt, iron, lead, cadmium, zinc, aluminum, mercury, or copper, or 5% nitrate of strontium, barium, or calcium.

Widely different concentrations of solutions may be employed and likewise the temperature and time of treatment may be varied, such variations in the strength of the solution, and the time and temperature of treatment being adjusted to obtain the desired thickness of coating in accordance with the principles stated in connection with the detailed disclosure of the second treatment.

Acid, in addition to that produced by the hydrolysis of the nitrates, accelerates the action, especially with nitrates of the alkaline earth metals, for example, which do not hydrolyze as much as some others.

The above examples produce coatings containing oxides, and which may be called oxide coatings. Similar coatings may be produced by other etching acids with other oxidizing agents, examples of which need not be multiplied exhaustively, but a few of which may be mentioned to indicate more clearly their nature.

To one gallon of water is added 20 cc. of 75% ortho-phosphoric acid and 20 grams of sodium chlorate. When used at 100° F. and sprayed on to the metal to be coated through the use of a mechanical spraying machine this solution is found to coat iron or steel in less than one minute. A small amount of metal other than iron and not above magnesium in the electromotive series, added in the form of a soluble salt, is helpful. Another formula used successfully at 100° F. is 20 cc. of 30% hydrofluoric acid and 20 grams of sodium chlorate in a gallon of water. Hydrofluosilicic acid may be substituted in the same amount in the formula just given. In place of the chlorate other compatible oxidizing agents may be used, such as perchlorates, persulphates, sulphites, nitrites, iodates, periodates, bromates, permanganates, peroxides, quinone and ceric salts, as well the nitrates mentioned above. The amount of oxidizing agent may be varied to a considerable extent, but as an indication of some proportions which have been successfully used, it may be stated that 8 cc. of 30% hydrogen peroxide has been employed in place of the 20 grams of sodium chlorate with 20 cc. of phosphoric acid in the formula given above, and 8 grams of sodium bromate, or 12 grams of sodium sulphite, or 10 grams of quinone, may be used in the same formula. Other amounts of the various oxidizing agents may be used, but the above is sufficient to indicate amounts which may be used with success. Instead of phosphoric, hydrofluoric or hydrofluosilicic acid, there may be used other etching acids such as sulphuric, hydrochloric, acetic, and citric.

Also, the oxidizing acids the salts of which are mentioned above may be employed where available in acid form. Oxalic and other acids of the group comprising the dicarboxylic and hydroxydicarboxylic acids of the aliphatic series and carboxylic acids and sulphonic acids of the aromatic series may be used in concentrations and at temperatures with oxidizing agents so as to produce more or less oxides in the coatings as well as organic salts of the metals. It is immaterial whether the acid is introduced as such or is introduced in a salt and released in the solution.

As will be understood, when phosphoric acid and/or its salts are used together with oxidizing agents, the presence or proportions of oxides and phosphates in the coat depend upon many conditions including the acidity of the bath, the strength and concentration of the oxidizing agent, the temperature and time of treatment.

Regardless of whether the first coat is composed of oxides, fluorides, sulphides or organic or inorganic salts of iron, with or without similar compounds of another metal, the coats produced in this way are more readily soluble in a chromic acid or chromate solution than is metallic iron, and as a result such a coating acts to reduce the tendency of the hexavalent chromium solution to creep and facilitates the firm adhesion of the final baked coat to the treated surface.

The above specific examples where the first treatment includes the use of nitrates are given first place because they include some of the earliest uses of this invention, but other acid solutions and other oxidizing agents along the line of the other examples noted have been found equally effective. In oxidizing solutions of this type, sulphurous acid or a sulphite acts as an oxidizing agent and also produces sulphide in the coating. If desired, a sulphide coating alone may be produced by the first treatment, as by using a weak solution, say 0.06%, of sulphurous acid, for a few seconds.

Normally coatings containing metals below iron in the electromotive series, even where quite substantial, have relatively little resistance to rusting. In fact, iron coated in this way frequently will rust more readily than the bare metal. However, when such a coating is covered with a hexavalent chromium solution dried thereon so as to form a glassy coat thereover, the resistance to bare corrosion is greatly increased and is much more than is obtained by drying the same chromium solution over the bare metal. Some examples of coating solution where the metal below iron in the electromotive series constitutes the chief coating chemical are specified so as to enable anyone to employ this phase of the invention although the list will be understood to be far from exhaustive. The metal below iron in the electromotive series is considered the chief coating chemical in the solution where that metal, or its oxide, is the chief ingredient in the coating aside from oxide of iron, even though oxide of iron which comes from oxidation of the surface being treated may constitute a major portion of the coating.

Before treatment the ferrous surface should be cleaned in any suitable manner. It may then be subjected for thirty seconds to a solution of the following composition at room temperature:

| | Percent |
|---|---|
| H₂O | 93 |
| 75% H₃PO₄ | 5 |
| NaClO₃ | .25 |
| As₂O₅ | .25 |
| Ferric iron | 1 |
| Cl as NaCl | .5 |

The following examples illustrate some variations of the process which have been successfully carried out. Every formula given is for 2000 cc. of water except where otherwise specified. The treatment was for 30 seconds at room temperature except where otherwise noted.

1. Cobalt nitrate .6H₂O _____ grams __ 5
 70% nitric acid _____ cubic centimeters __ 20
2. Nickel carbonate _____ grams __ 3
 75% phosphoric
  acid _____ cubic centimeters __ 10
3. Potassium antimony tartrate ___ grams __ 15
 70% nitric acid _____ cubic centimeters __ 100
4. Stannous phosphate _____ grams __ 5
 70% nitric acid _____ cubic centimeters __ 50
5. Mercuric nitrate _____ grams __ 5
 70% nitric acid _____ cubic centimeters __ 40
 Treating time _____ seconds __ 5
6. Lead nitrate _____ grams __ 10
 70% nitric acid _____ cubic centimeters __ 20
 Treating time _____ seconds __ 5
7. Molybdic oxide _____ grams __ 1
 75% phosphoric
  acid _____ cubic centimeters __ 20
8. Bismuth nitrate 5H₂O _____ grams __ 5
 70% nitric acid _____ cubic centimeters __ 20
9. Titanium dioxide _____ grams __ 1
 Sulphuric acid _____ cubic centimeters __ 7.5
 Nitric acid _____ do ____ .5
 Water _____ do ____ 1000
10. Thallium trichloride _____ grams __ 1
 Sulphuric acid _____ cubic centimeters __ 5
 Nitric acid _____ do ____ 2.5
 Treating time, 180° _____ seconds __ 30
 Water _____ cubic centimeters __ 1000
11. Tungstic oxide _____ grams __ 1
 Sulphuric acid _____ cubic centimeters __ 5
 Water _____ do ____ 1000
 Treating time, 200° _____ minutes __ 1

Other solutions containing oxidizing agents are illustrated in the following examples; and have been used successfully by treating for 15 seconds at room temperature:

12. Water _____ cubic centimeters __ 1000
 Concentrated sulphuric acid _____ do ____ 2
 Arsenic pentoxide _____ grams __ 5
 Sodium chlorate _____ do ____ 10
13. Water _____ cubic centimeters __ 1000
 Concentrated hydrochloric acid __ do ____ 25
 Arsenic pentoxide _____ grams __ 10
 Sodium chlorate _____ do ____ 10
14. Water _____ gallons __ 1
 75% phosphoric
  acid _____ cubic centimeters __ 20
 Sodium arsenate _____ grams __ 1
 30% hydrogen
  peroxide _____ cubic centimeters __ 8

It will be understood that the above examples are by way of illustration and that other acids and other oxidizing agents may be employed within the lists of acids and oxidizing agents elsewhere recited herein as well as any other compatible oxidizing agents.

It is desirable in many cases to employ for the first step of the processing an acid solution, preferably making use of acids which will not prevent the plating out of at least some part of the metal in the solution. Oxidizing acids such as nitric acid, are of advantage. Where other acids such as phosphoric or sulphuric are employed, it is desirable in some cases to employ an oxidizing agent in the solution, making it possible to obtain the desired results in a shorter time. Mixtures of oxidizing agents may be used, if desired.

Where oxidizing agents are omitted from the acid solution containing soluble salts of metals below iron in the electromotive series, the coating action is somewhat slower, and the resultant coating contains less oxide of iron.

It is understood that the invention is not limited to the combinations set forth in the formulae given above, for the various etching acids may be used interchangeably with the various metal accelerators and/or the various oxidizing agents to produce oxide and/or metal coatings, and of course any suitable combinations may be employed for producing phosphate, oxalate or other salt coatings which may or may not include salts of one or more metals other than iron.

Where a metal below iron in the electromotive series is relied upon as the chief chemical in forming or expediting the coating, the most advantageous results appear to have been given by soluble compounds of arsenic, bismuth, antimony, molybdenum, lead and tin, and these are the preferred metals for that purpose.

It is not believed necessary to give detailed examples of solutions for forming phosphate coatings or coatings of salts of organic acids, as many such are well known. It is necessary merely to point out that the effect of such solutions should be reduced by a modified composition, or by a reduction in the time or temperature of treatment, or by some combination of these modifications, so that the coating resulting from the first solution will not be too heavy and prevent the second solution from forming the main coating. Also, in some of the above specific examples for oxide coats, some may produce coatings too heavy for preferred results upon some kinds of ferrous surfaces, and when this is the case the coating effect of the solution should be reduced.

A simple etching, as by sulphuric, hydrochloric, acetic, or any etching acid, if not rinsed excessively, leaves some salt of the metal at the surface of the work, and where the second step follows promptly and the tendency of the second solution to creep is not too great, this remnant of salt, although invisible, is sufficient to overcome the tendency to creep and to result in a better bond between the metal and the dried film of the second solution. Etching is desired, and inhibitors, such as customarily employed for cleaning or pickling metal, should be omitted.

While the preferred preliminary treatment is by means of chemical solutions as described above, part or all of the preliminary treatment may be by reactive gases or vapors, if preferred. After treatment in any of the ways referred to above, the metal surfaces should have applied thereto a hexavalent chromium compound, and the solution clinging to the work should be baked, preferably at a temperature of 500° F. or above. If the chromium is in the form of chromic acid, there is a considerable tendency to creep. If the chromium compound is in the form of chromates or dichromates, the tendency to creep is not so strong. Generally a visible, though thin, preliminary coating is desirable, but the amount as well as kind of preliminary coating should be suited to the final solution so as to be sufficiently reactive to overcome the tendency to creep and to bond the final coat to the metal.

During baking, some of the hexavalent chromium is reduced to trivalent chromium. Where desired, the baking time may be somewhat reduced by introducing some trivalent chromium, such as chromic nitrate, chromic phosphate, or chromic sulphate, in place of some of the chromic acid in the solution. Reaction with the products of the first treatment likewise seems to tend to reduce the drying time, especially where the products of such reaction form an appreciable proportion of the final coating.

It has been found advantageous to use a mixture of chromic acid and/or chromic acid salt with phosphoric acid and/or salts thereof for the second step of the process. A good solution for this purpose is 3% of chromic acid and 6% phosphoric acid, with which a pretreatment is preferred which gives a visible, though very thin coating. Such a solution baked at 550° F. for 10 minutes gives good results.

The results of baking are modified by introducing some or all of the $PO_4$ in combination with a metal or by otherwise introducing some metal in the first solution as applied. The proportions suggested are, of course, by way of example only, since they may be varied widely while obtaining some of the benefits of the two step combination which is the subject of this invention. While the benefits of the invention may extend beyond that range, they are particularly important where the amount of hexavalent chromium in the solution is such that it substantially inhibits at ordinary room temperature any pickling action of any phosphoric acid present upon the bare metal.

Treatment such as described above produces a thin coating, weighing from ½ gram to 1½ grams per square yard of surface depending upon the method of application etc. Such a coating is continuous and glassy or non-crystalline in appearance and when the two steps are properly related, has an adhesion to the metal as great or greater than the cohesion of the coating, so that bending the metal tends to crack the coat, leaving the broken parts adhering to the metal, instead of loosening the coating entirely from the metal.

If the first treatment produces too heavy a coating, the action of the final solution is likely to consist chiefly in modification of the first coating, but without materially changing its appearance. Where the first reaction is stopped before it produces too heavy a coat, and the density, time of application and drying of the second solution are regulated so that the products of the first reaction constitute only a minor part of the final coat, the desired coat with a glassy appearance will be attained.

It is preferred to employ a solution for the second treatment which will not visibly etch bare metal at room temperature, and it is preferable also that there shall be some chromic acid, by hydrolysis or otherwise, in this second solution. For this reason, if dichromates are employed without phosphoric acid or some other acidifier, dichromates which hydrolyze to give some free acid should be used. The dichromates of sodium and potassium do not hydrolyze sufficiently without some additional acidifying agent. The dichromates of ammonium and of the less basic metals decompose or hydrolyze sufficiently to give beneficial results when used alone, but a very thin, not more than barely visible, first coat is usually preferable when no acidifier except a dichromate is used; and some additional acidifier is usually preferred. Where salts of ammonium are included, ammonium is driven off during baking, and if driven off in sufficient quantity may result in sufficient acidification during the baking process.

In some instances, the first treatment may comprise applying a film of an etching acid and drying some of the acid on the surface along with the product of its reaction. With such a preliminary treatment, less acid dichromate may be used; but of course this preliminary treatment may be employed also where chromic acid is employed in the second solution. For example, a film of a phosphoric acid solution may be applied first and allowed to etch the metal to some extent, and may be dried at least partially, if desired, and then the solution of chromic acid may be applied thereover and allowed to react therewith during drying.

While under some circumstances beneficial results may be obtained by drying at room temperature or any degree of raised temperature, a comparatively brief baking temperature at least as high as 550° F. is preferred for commercial work when this is feasible.

A ferrous article coated in this way is provided with a continuous, glassy coat and an intermediate layer bound by chemical reaction to the metal surface on one side and to the glassy coat on the other side. If the final solution was applied directly to the ferrous metal, it might react during baking so as to produce a reaction which would chemically bond it to the metallic iron, but where the two-step process is followed and there remains some of the product of the first reaction after the second solution has been applied and baked, there may, with propriety, be said to remain an intermediate layer bonded on one side to the metal and on the other side to the glassy coat, even though the glassy coat may at some points penetrate the intermediae layer and have some direct bond to the metal.

By reason of the pretreatment, the final solution wets the surface completely and does not creep during drying, so that the final glassy coat is substantially uniform in thickness.

Metal treated in this way, and having the glassy coating properly baked thereon, not only forms a good base for paint, but has a greatly increased resistance to corrosion during storage and shipment prior to painting. The metal can be bent and drawn to a considerable extent without destroying its paint-holding characteristics, and it can also be welded at a rapid rate.

During fabrication, steel is usually covered with oil or drawing compounds and must be cleaned before the final paint, enamel or lacquer is applied. The cleaning is usually by alkali cleaners. Such cleaning may be employed on metal provided with a properly baked glassy coat. The alkali cleaning is usually followed by a hot water rinse. It has been found that if, following a cleaning in a dilute alkali cleaning solution, the coated metal is given a rinse in a solution containing chromic acid, phosphoric acid, or oxalic acid, the best results are obtained when the painted surface is subjected to a humid atmosphere, in that the tendency of the finish to blister is reduced to a minimum. In cleaning the treated surface with an alkali cleaning solution, care should be taken that the cleaning solution is not of such strength as to remove the coating from the ferrous surface.

While many alternative treatments have been disclosed specifically, it will be understood that the invention may be carried out in other ways within the scope of the above disclosure and of the appended claims.

What I claim is:

1. The method of coating a ferrous surface with an aqueous solution containing a dissolved compound of hexavalent chromium and having a tendency to creep when a film thereof is baked on a metal surface, which consists in producing on the metal surface a chemical reaction the product of which is more soluble than is metallic iron in said solution, leaving at least a trace of said products on the surface and thereafter applying to the surface a film of the solution, dissolving at least some of said products in the film, baking the film, and regulating the first said reaction and the action of said solution so that not more than a minor part of the total coat consists of unchanged products of the first said reaction.

2. The method of coating a ferrous surface with an aqueous solution containing a dissolved compound of hexavalent chromium and having a tendency to creep when a film thereof is baked on a ferrous surface, which consists in producing on the metal surface a chemical reaction a product of which is more soluble than is metallic iron in said solution, leaving at least a trace of said product on the surface and thereafter applying to the surface a film of the solution and combining with ingredients of said solution part of said products of the first said reaction and some of the metal surface beneath said products and baking a film of the solution on the surface.

3. A method in accordance with claim 1 and in which the solution is acidulous.

4. A method of coating a ferrous surface with an acidulous solution containing, as its chief essential chemicals, compounds of hexavalent chromium and of $PO_4$ which consists in producing on the metal surface a chemical reaction, a product of which is a compound of metal more soluble in said solution than is the metallic iron being coated, leaving on the surface products of said reaction, thereafter applying to the surface a film of the solution, dissolving in the solution a portion of said products, baking the film, and regulating the first said reaction and the action of said solution so that not more than a minor part of the total coat consists of unchanged products of the first said reaction.

5. The method of coating a ferrous surface with an aqueous solution containing a dissolved compound of hexavalent chromium as an essential coating-forming chemical, which consists in producing on the metal surface a chemical reaction the product of which is more soluble than is metallic iron in said solution, leaving at least a trace of said products on the surface, and thereafter applying to the surface a film of the solution, dissolving at least some of said products in the film, and heating the film during said reaction and continuing the heat until the film is dried, and regulating the first reaction and the density, composition and drying of said solution to produce on the surface a glassy, non-crystalline film, and so that not more than a minor part of the total coat consists of unchanged products of the first said reaction.

6. A method in accordance with claim 5 and wherein the hexavalent chromium compound in the solution is substantially entirely in the form of a dichromate and in which the products of the first reaction remaining on the work forms a film so thin as to be not more than barely visible.

7. A method in accordance with claim 5 and wherein the hexavalent chromium in the solution is largely in the form of chromic acid and wherein the products of the first reaction remaining on the work at the beginning of the second treatment constitute a thin but readily visible coating.

8. A process which comprises applying to a ferrous surface an aqueous solution containing as its chief coating chemical a metal below iron in the electromotive series, rinsing off the excess of the solution, and thereafter applying to the treated surface a solution containing hexavalent chromium and the $PO_4$ radical and producing a rust-resistant coating by drying the solution onto the said treated surface, and regulating the steps so that said rust-resisting coating is greater in amount than the remaining product of the first said solution.

9. A process which comprises the steps of treating a ferrous surface with an aqueous solution containing as its chief coating chemical a compound of arsenic, removing the excess of said solution, and thereafter applying to the treated surface a solution containing hexavalent chromium and the $PO_4$ radical and allowing the said solution to dry upon the treated surface, and regulating said steps so that the coating formed by the second step is greater than the remaining product of the first step.

10. A process which comprises applying to a ferrous surface an aqueous solution containing as its chief coating chemical a metal below iron in the electromotive series, and thereafter producing a heavier coating by applying to said treated surface a solution containing hexavalent chromium and the $PO_4$ radical and baking said solution upon the said surface, cleaning the surface with an alkali cleaner, and thereafter rinsing said surface with a solution of one of the group consisting of chromic, phosphoric and oxalic acid.

11. A process which comprises applying to a ferrous surface an aqueous solution containing as its chief coating chemical a metal below iron in the electromotive series, and an acid which will not prevent said metal from at least partially plating out on said ferrous surface, and thereafter applying to the treated surface a solution containing hexavalent chromium and the $PO_4$ radical and producing a rust-resistant coating by allowing the said solution to dry upon the said treated surface, and regulating the steps so that said rust-resisting coating is greater in amount than the remaining product of the first said solution.

12. A process which comprises applying to a ferrous surface an aqueous solution containing as its chief coating chemical a metal below iron in the electromotive series, and an acid of the group consisting of nitric, phosphoric, sulphuric and hydrochloric, and thereafter applying to said treated surface a solution containing hexavalent chromium and the $PO_4$ radical and producing a rust-resisting coating by drying the solution onto the said treated surface, and regulating the steps so that said rust-resisting coating is greater in amount than the remaining product of the first said solution.

13. A process which comprises the steps of treating a ferrous surface with an aqueous solution containing as its chief coating chemicals a metal below iron in the electromotive series and an oxidizing agent, and thereafter applying to the treated surface a solution containing hexavalent chromium and the $PO_4$ radical and producing a coating through which the metal is readily weldable by drying the solution onto said surface, and regulating said steps so that the coating formed by the second step is greater than the remaining product of the first step.

14. A process which comprises the steps of treating a ferrous surface with an aqueous solution containing as its chief coating chemicals a metal of the group consisting of arsenic, bismuth, antimony, molybdenum, lead and tin, and an oxidizing agent of the group consisting of nitrates, nitrites, chlorates, perchlorates, permanganates, sulphites, persulphates, iodates, periodates, bromates, peroxides, quinone and ceric salts, and thereafter applying to the surface a solution containing hexavalent chromium and the $PO_4$ radical and producing a coating through which the metal is readily weldable by drying the last said solution onto said surface, and regulating said steps so that the coating formed by the second step is greater than the remaining product of the first step.

15. An article having a ferrous surface covered with a substantially uniform, continuous, glassy coat formed by the drying of an aqueous solution containing a dissolved compound of hexavalent chromium, and an intermediate layer bound by chemical reaction to the metal on one side and and the glassy coat on the other side, said glassy coating being greater than said intermediate layer.

16. An article having a ferrous surface covered with a substantially uniform, continuous, glassy coat formed by the drying of an aqueous solution containing a dissolved compound of hexavalent chromium, and an intermediate layer bound by chemical reaction to the metal on one side and the glassy coat on the other side, said intermediate layer comprising oxide of iron, said glassy coating being greater than said intermediate layer.

17. An article having a ferrous surface covered with a substantially uniform, continuous, glassy coat formed by the drying of an aqueous solution containing a dissolved compound of hexavalent chromium, and an intermediate layer bound by chemical reaction to the metal on one side and the glassy coat on the other side, said intermediate layer comprising a compound of iron and a compound of another metal not higher than magnesium in the electromotive series, said glassy coating being greater than said intermediate layer.

18. An article having a ferrous surface covered with a substantially uniform, continuous, glassy coat formed by the drying of an aqueous solution containing a dissolved compound of hexavalent chromium, and an intermediate layer bound by chemical reaction to the metal on one side and the glassy coat on the other side, said intermediate layer comprising a compound of a metal below iron in the electromotive series, said glassy coating being greater than said intermediate layer.

19. A weldable article having a ferrous surface covered by a substantially uniform, continuous, glassy coat formed by drying an aqueous solution containing a dissolved compound of hexavalent chromium and $PO_4$ as major chemical constituents, and an intermediate layer bound by chemical reaction to the ferrous metal on one side and to the glassy coat on the other side, said glassy coating being greater than said intermediate layer.

20. An article having a ferrous surface carrying an adherent coating comprising arsenic, hexavalent chromium, and the $PO_4$ radical, the arsenic having been applied by one step and the hexavalent chromium and the $PO_4$ radical by a second step.

21. A method in accordance with claim 4 and comprising completing the baking before the reaction has reduced all of the hexavalent chromium in the film.

22. A method in accordance with claim 5 and comprising effecting the first said chemical reaction by an acidulous solution containing an oxidizing agent.

23. A method in accordance with claim 5 and comprising effecting the first said chemical reaction by an acidulous solution containing an oxidizing agent and a compound of a metal not higher than magnesium in the electromotive series.

24. A method in accordance with claim 5 and comprising effecting the first said reaction by an acidulous solution containing a compound of a metal not higher than magnesium in the electromotive series.

25. An article in accordance with claim 19 and in which the intermediate layer comprises metal of the group consisting of arsenic, bismuth, antimony, molybdenum, lead and tin.

26. An article in accordance with claim 19 and in which the intermediate layer comprises bismuth.

27. An article in accordance with claim 19 and in which the intermediate layer comprises molybdenum.

JOHN S. THOMPSON.